United States Patent

[11] 3,600,003

| | | |
|---|---|---|
| [72] | Inventor | William R. Carey<br>Farmington, Mich. |
| [21] | Appl. No. | 808,704 |
| [22] | Filed | Mar. 19, 1969 |
| [45] | Patented | Aug. 17, 1971 |
| [73] | Assignee | Eaton Yale & Towne, Inc.<br>Cleveland, Ohio<br>Continuation of application Ser. No.<br>625,518, Mar. 23, 1967, now abandoned. |

[54] VEHICLE SAFETY SYSTEM
12 Claims, 4 Drawing Figs.

[52] U.S. Cl. .................................................. 280/150 AB,
74/493
[51] Int. Cl. ........................................................ B60r 21/08
[50] Field of Search ........................................... 280/150;
74/492, 493

[56] References Cited
UNITED STATES PATENTS

| | | | |
|---|---|---|---|
| 2,842,372 | 7/1958 | D'Antini ..................... | 280/150 UX |
| 2,850,291 | 9/1958 | Ziccardi ..................... | 280/150 |
| 2,852,956 | 9/1958 | May ........................... | 74/493 |
| 2,899,214 | 8/1959 | D'Antini ..................... | 280/87 |
| 3,197,234 | 7/1965 | Bertrand ..................... | 280/150 |
| 3,373,629 | 3/1968 | Wight et al. ................ | 74/492 |
| 3,450,414 | 6/1969 | Kobori ........................ | 280/150 |

FOREIGN PATENTS

| | | | |
|---|---|---|---|
| 609,624 | 9/1960 | Italy ........................... | 280/150 |

Primary Examiner—Kenneth H. Betts
Attorney—Teagno & Toddy

ABSTRACT: A steering column assembly for a vehicle to protect the operator thereof. An inflatable bag and a container for storing fluid for inflating the bag removably disposed as a unit within a recess in the assembly. The bag includes means comprising a rupturable patch for dissipating the energy resulting from movement of an operator against the inflated bag, thereby minimizing rebound of the operator. The steering column includes multiple overlapping components which are interconnected by shearpins and the container is disposed in the recess so that as fluid flows from the container to inflate the bag, a thrust is created on the column to shear the shearpins and collapse the column as the bag is being inflated.

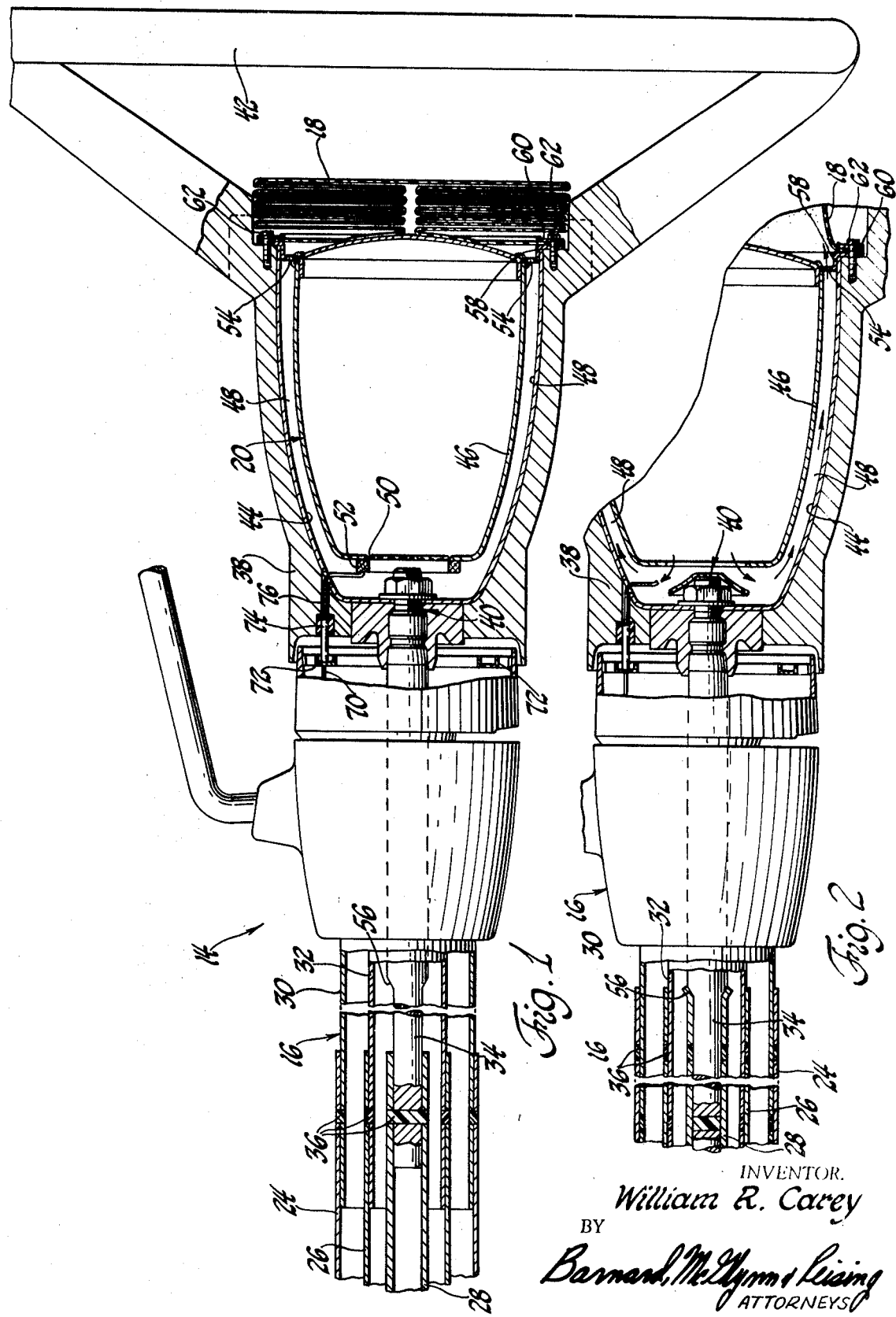

VEHICLE SAFETY SYSTEM

This application is a continuation application of U.S. Ser. No. 625,518, filed Mar. 23, 1967, now abandoned, and assigned to the same assignee as the present invention.

One of the most significant causes of injuries to operators of automobiles during accidents is the forward movement of the operator and the resulting impact with the steering column of the automobile. In an attempt to alleviate this problem, various different collapsible steering columns have been utilized. Such collapsible steering columns do not completely alleviate the problem, however, since the operator may still impact against the collapsed steering column to cause very serious or fatal injuries. Other alternatives have also been provided in an attempt to solve this problem. In some assemblies, a padded cushion is disposed on the steering wheel of the assembly to cushion the impact between the operator and the steering column. The operator, however, may impact against such a padded cushion with a force sufficient to cause serious or fatal injuries. In other assemblies, a small cushion is inflated with a fluid such as air to alleviate or minimize the impact of the operator against the steering column. However, assemblies of this type heretofore utilized do not completely solve the problem since they do not prevent impact between the operator and the steering column but merely reduce the force of such impact. For example, in one prior art assembly, a steering column is mechanically retracted by mechanical linkage in response to collapse of the front of the automobile. Also included in this assembly is a small cushion on the steering wheel which is inflated by compressed air conveyed through a tube from a remote source. The air is allowed to flow through the tube as a valve is mechanically opened in response to the collapse of the front of the automobile. In such a system, the mechanical actuating mechanism which moves in response to the impact and collapse of the automobile has not proven satisfactory because of the deformation of the linkage and the unsatisfactory long time period involved to retract the column and inflate the cushion. Because of the remoteness of the source of compressed air, insufficient air is available at the cushion in the time allowed during such a crash. Consequently, the inflated cushion is entirely too small to prevent the operator from impacting against the steering column. Furthermore, the prior art assemblies do not prevent or minimize the rebound of the operator after impact. Such rebound causes very serious injuries, one of which is commonly called whiplash.

Accordingly, it is an object and feature of this invention to provide a steering assembly for a vehicle which, in the event of an accident, prevents the operator thereof from impacting thereagainst and prevents or minimizes rebound of the operator.

Another object and feature of this invention is to provide a safety assembly for protecting an operator of a vehicle which includes a steering column assembly having an inflatable bag operatively connected thereto and means for inflating the bag in response to a predetermined operating condition of the vehicle with the bag including means for automatically dissipating the energy resulting from the movement of the operator against the inflated bag, thereby minimizing rebound of the operator.

A further object and feature of this invention is to provide a safety assembly for a vehicle including a steering assembly having a recess therein and an inflatable bag and means for inflating the bag removably retained in the recess as a unit whereby removal and replacement or repair is easily accomplished and whereby the bag may be rapidly inflated.

A further object and feature of this invention is to provide a safety system for protecting the operator of a vehicle and including a steering column assembly in combination with an inflatable bag and including means allowing the steering column to collapse as the bag is being inflated to provide sufficient distance in which to decelerate the operator at a noninjurious rate to prevent injurious impact with the steering assembly.

In general, these and other objects and features of this invention may be attained in a preferred embodiment including a steering column having overlapping components with at least one shearpin interconnecting the components to allow the column to collapse in response to a predetermined force. A rotatable hub is supported by the column and includes a steering wheel. The hub has a recess therein and a container for storing fluid is removably disposed within and in spaced relationship with the recess to define a fluid flow passage. An inflatable bag is associated with the container so that the container and the bag comprise a unit which may be readily removed and replaced. An explosive means is disposed adjacent the container at the closed extremity of the recess for opening the container upon activation thereof so that fluid flows from the container and through the passages to inflate the bag. As the fluid flows from the container to inflate the bag, a thrust is created to shear the shearpins and to collapse the column. The bag includes means, comprising a rupturable patch, for dissipating the energy resulting from the forward movement of the operator against the bag, thereby minimizing rebound.

Other objects and attendant advantages of the present invention will be readily appreciated as the same becomes better understood by reference to the following detailed description when considered in connection with the accompanying drawings wherein:

FIG. 1 is a fragmentary cross-sectional view disclosing a preferred embodiment of the instant invention in the inactivated or normal condition;

FIG. 2 is a fragmentary cross-sectional view similar to FIG. 1 but showing the device in the activated condition;

Figure 3:
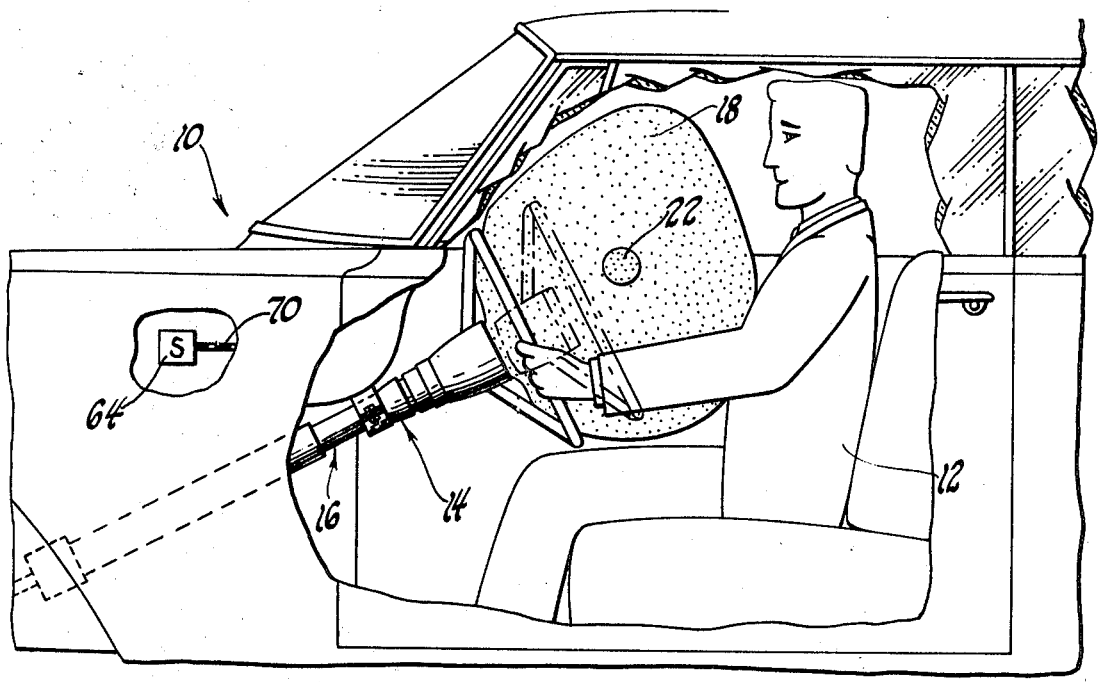
FIG. 3 is a fragmentary environmental view showing the assembly in the activated condition.

Referring now to the drawings, wherein like numerals indicate like or corresponding parts throughout the several views, a vehicle is generally shown at 10 and a safety assembly for protecting an operator 12 of the vehicle is generally shown at 14.

There is included a steering assembly, generally included at 16, an inflatable confinement or bag 18 operatively connected to the steering assembly, and fluid source means generally indicated at 20 for inflating the bag 18 in response to a predetermined operating condition of the vehicle 10.

Figure 4:
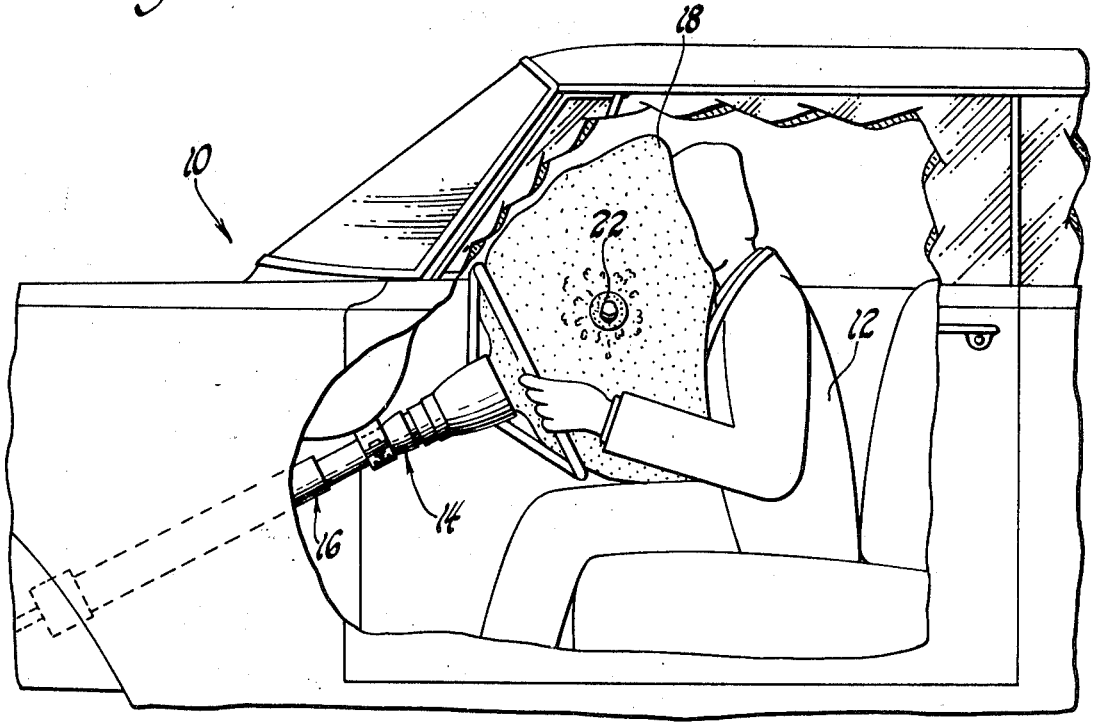
FIG. 4 is a fragmentary environmental view showing the device in the activated position and the forward movement of the operator being decelerated by the inflated bag.

The bag 18 includes means comprising the patch 22 for automatically dissipating the energy resulting from the movement of the operator 12 against the inflated bag 18, thereby minimizing rebound of the operator. More specifically, the patch 22 covers an aperture in the bag 18 and is made so that it ruptures as indicated in FIG. 4 to exhaust fluid from the bag as the operator 12 moves against the bag 18. Thus, at the end of the forward movement of the operator, the energy has been dissipated and insufficient energy remains to injuriously move the operator in the opposite direction, i.e., rebound.

The steering assembly 16 includes a steering column comprising the tubular overlapping components 24, 26, 28, 30, 32 and 34. The telescoping tubular components 24 and 30 comprise the housing of the column. The telescoping tubular components 26 and 32 comprise the gearshift or transmission-operating member. The component 28 and the component or shaft 34 comprise the steering shaft and are telescopically interrelated. There is also included means comprising the shearpins 36 for allowing the column to collapse in response to a predetermined force.

A rotatable hub 38 is connected by the threaded means, generally indicated at 40, to the shaft 34. A steering wheel 42 is formed integrally with the hub 38 so that upon rotation of the wheel 42, the shaft 34 and component 28 are rotated.

The hub 38 has a recess 44 therein. The fluid source means 20 comprises a container 46 for storing fluid, such as a compressed gas. The container 46 is disposed within and in spaced relationship with the recess 44 to define the annular fluid flow passages 48.

The extremity of the container 46 which is disposed adjacent the closed end of the recess 44 has a groove 50 therein and an explosive means 52 is included for opening the container 46 and establishing fluid communication with the bag 18. The groove 50 is commonly referred to as a stress riser and upon activation or detonation of the explosive means 52, the container 46 is severed or opened along the groove 50 so that the pressurized fluid within the container 46 moves the severed portion to the position illustrated in FIG. 2. When the severed portion is in the position illustrated in FIG. 2, the fluid from within the container 46 flows about the container 46, through the passage 48, and through the apertures 54 to inflate the bag 18. As the fluid flows along the passage 48 and into the bag 18, a thrust results to create a predetermined force sufficient to sever the shearpins 36 and move the assembly to the position illustrated in FIGS. 2 through 4.

One of the components of the column, namely the shaft 34, includes a tapered portion 56 for wedgingly engaging the end of the tubular member 28 so as to deform the end of the tubular member 28 as shown in FIG. 2 to prevent the column from rebounding toward the uncollapsed position shown in FIG. 1.

The container 46 includes a flange 58 upon which is disposed the periphery of an opening in the bag 18. An annular clamping member 60 is secured in place by the bolts 62 to seal the bag 18 against the flange 58. Thus, the bag 18 and the container 46 comprise a unit which is removably connected to the hub by bolts 62. The bag 18 and the fluid container 46 may be, therefore, readily removed, repaired, or replaced.

A sensing means is shown at 64 in FIG. 3 for activating the explosive means 52 in response to a predetermined operating condition of the vehicle. The sensing means 64 may be an inertia-responsive switch, an accelerometer, or any other appropriate means which will sense a predetermined operating condition of the vehicle, such as deceleration during a crash, and send a signal to the explosive means 52 for detonating the explosive means 52, thereby inflating the bag 18 and collapsing the column. An example of an appropriate sensing means is disclosed in U.S. Pat. No. 2,778,896. Preferably, the sensing means 64 sends an electric current to detonate the explosive means 52. A lead 70 extends from the sensing means 64 to a ring 72 which is supported in the housing member 30. A contact member 74 rotates with the hub 38 and is in electrical contact with the ring 72. Current from the contact 74 passes through the lead 76 to an appropriate detonator disposed adjacent the explosive means 52.

In operation, the assembly is normally in the inactivated or normal position as illustrated in FIG. 1. In the event the vehicle 10 becomes involved in an accident such as a crash, or the like, the sensing means 64 responds to the condition of the vehicle 10 and sends a signal to detonate the explosive means 52. Upon the detonation of the explosive means 52, the container 46 is severed along the groove 50 to provide an opening through which the fluid from within the container flows. As the fluid flows through the passage 48 and into the bag 18, a thrust is created to provide a sufficient force for shearing the shearpins 36 so that the column moves to the position illustrated in FIGS. 2 through 4. The inflation of the bag 18 and the collapse of the column occurs within milliseconds and is completed before the operator 12 begins to move forward as a result of the crash. In other words, the bag inflates and the column collapses from the phantom position to the full position illustrated in FIG. 3 while the operator 12 remains substantially in the position indicated in FIG. 3. When the column collapses, the tapered portion 56 on the shaft 34 wedgingly engages the end of the tubular shaft 28 to wedge the components 28 and 34 together to prevent the column from rebounding or moving back toward the initial position illustrated in FIG. 1 and in phantom in FIG. 3. A short time after the system has been activated, the operator 12 begins to move forward against the bag 18 as illustrated in FIG. 4. The patch 22 ruptures as illustrated in FIG. 4 to exhaust fluid from the bag 18 to dissipate the energy resulting from the forward movement of the operator 12 to minimize rebound. By moving the steering wheel 42 to the collapsed position as illustrated in FIGS. 2 through 4, a greater distance is established between the steering wheel and the operator 12 so that the operator 12 moves over a greater distance while being decelerated at a noninjurious rate by the bag 18. The rupture of the patch 22 exhausts fluid from the bag 18 as the operator 12 moves thereinto so that when the operator's forward movement is halted by the bag, there is no longer any energy remaining to move the operator in the reverse direction, i.e., no longer any energy to cause rebound.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What I claim is:

1. A safety assembly for protecting an operator of a vehicle comprising a steering assembly, an inflatable bag operatively connected to said steering assembly, means for inflating said bag in response to a predetermined condition, said bag including means for automatically dissipating the energy resulting from movement of an operator against the inflated bag during such movement thereby minimizing rebound of the operator, said steering assembly including a steering column having means for allowing said column to collapse in response to the inflating of said bag, said steering column including a rotatable hub having a recess therein, said means for inflating said bag including a container for storing fluid, said container being disposed in said recess, and means for opening said container and establishing fluid communication with said bag to establish a thrust as fluid flows from said container to inflate said bag so that said column collapses in response to the thrust.

2. An assembly as set forth in claim 1 wherein said container is disposed within and in spaced relationship with the walls of said recess to define a fluid flow passage, said bag being disposed at one extremity of said recess, and an explosive means associated with said container at the other extremity of said recess for opening said container upon the activation thereof.

3. An assembly as set forth in claim 1 wherein said column includes overlapping components and said means for allowing said column to collapse comprises at least one shearpin interconnecting said components.

4. An assembly as set forth in claim 3 wherein at least one of said components includes a tapered portion for wedgingly engaging another component upon the collapse of said column to prevent said column from rebounding toward the uncollapsed position.

5. A safety assembly for protecting an operator of a vehicle comprising a steering assembly, an inflatable bag operatively connected to said steering assembly, means for inflating said bag in response to a predetermined condition, said bag including means for automatically dissipating the energy resulting from movement of an operator against the inflated bag during such movement thereby minimizing rebound of the operator, said steering assembly having a recess therein, said bag and said means for inflating said bag being removably disposed in said recess, said means for inflating said bag including a container for storing fluid, said container being disposed within and in spaced relationship to the walls of said recess to define a fluid flow passage, said bag being disposed at one extremity of said recess, and means associated with said container at the other extremity of said recess for opening said container so that fluid flows out of said container, through said passage and into said bag.

6. An assembly as set forth in claim 5 wherein said means for opening said container comprises an explosive means.

7. An assembly as set forth in claim 5 wherein said steering assembly includes a collapsible column including means for allowing the collapse thereof in response to the thrust created as the fluid flows from said container and into said bag.

8. A safety assembly for protecting an operator of a vehicle comprising a steering assembly, an inflatable bag operatively connected to said steering assembly, means for inflating said bag in response to a predetermined condition, said bag including means for automatically dissipating energy resulting from movement of an operator against the inflated bag during such movement thereby minimizing rebound of the operator, said steering assembly including a column having overlapping components, at least one shearpin interconnecting said components to allow said column to collapse in response to a predetermined force, a rotatable hub supported by said column and including a steering wheel, said hub having a recess therein, said means for inflating said bag including a container for storing fluid, said container being disposed within and in spaced relationship with the walls of said recess to define a fluid flow passage, means for removably attaching said container and said bag to said hub, said bag being disposed adjacent the open extremity of said recess, and explosive means disposed adjacent the closed extremity of said recess for opening said container upon the activation thereof.

9. An assembly as set forth in claim 8 wherein said means for dissipating energy comprises a rupturable patch disposed over an aperture in said bag for rupturing to exhaust fluid from said bag as the operator moves against the bag.

10. A safety apparatus for protecting the driver of a vehicle comprising a steering column with a steering wheel at one end thereof, a confinement supported on said steering wheel, said confinement having a collapsed inoperative condition and an expanded operative condition in which said confinement is operable to restrain movement of the driver of the vehicle relative to the steering wheel of the vehicle, said steering column being collapsible upon impact by a predetermined force to enable said steering wheel to move upon impact of the driver thereagainst, explosive means providing for fluid flow from a fluid source to effect expansion of said confinement and operable independently of movement of the steering wheel, and means for effecting movement of the steering wheel away from the driver simultaneously with expansion of the confinement, said means for effecting movement of the steering wheel comprising means against which the thrust of the fluid flowing into the confinement acts to move the steering wheel.

11. A safety apparatus for use in restraining movement of a driver of a vehicle relative to a steering means of the vehicle to protect the driver from a forceful impact with the steering means during an accident, said safety apparatus comprising structure defining a recess in said steering means, a confinement supported by said steering means, said confinement having a collapsed inoperative condition and an expanded operative condition for restraining movement of the driver, a source of fluid operatively connected with the confinement to effect expansion thereof, said source of fluid being located in the recess in said steering means, means for providing for flow of fluid from said source to expand said confinement including a flow passage between said source of fluid and said confinement, said flow passage being defined at least in part by a portion of said structure defining the recess and said fluid source.

12. In a vehicle, a steering column with a steering wheel at one end thereof, means for enabling rotational movement of said steering wheel relative to said steering column, a confinement supported on the steering wheel and rotatable therewith relative to said steering column, said confinement having an inoperative collapsed position and an expanded operative position in which said confinement is operable to restrain movement of the driver of the vehicle relative to the steering wheel of the vehicle, a source of fluid for expanding said confinement supported on said steering wheel and rotatable therewith relative to said steering column, said confinement when in said operative position filling the major portion of the interior of the vehicle between the steering wheel and the driver, and means for expanding said confinement to said operative position prior to movement of the driver of the vehicle relative to the vehicle as a result of an accident and in response to the vehicle encountering an accident condition including electrically actuatable means carried by the steering wheel and rotatable therewith relative to said steering column for providing for fluid flow from said fluid source into said confinement and operable independently of movement of the steering wheel, sensor means supported remote from said steering wheel, said sensor means being operable in response to the vehicle encountering an accident condition to provide an electrical actuating signal for actuating said electrically actuatable means, and means operatively interconnecting said sensor and said electrically actuable means for providing fluid flow from the fluid source to transmit the electrical actuating signal therebetween including means operatively associated with said steering wheel and said steering column to enable said electrical actuating signal to be transmitted therebetween to activate said electrically actuable means.